United States Patent

[11] 3,551,636

| [72] | Inventor | Jerome W. Nelson<br>Houston, Tex. |
|---|---|---|
| [21] | Appl. No. | 755,285 |
| [22] | Filed | Aug. 26, 1968 |
| [45] | Patented | Dec. 29, 1970 |
| [73] | Assignee | CRC-Crose International Inc.<br>a corporation of Oklahoma |

[54] AUTOMATIC PIPELINE WELDING METHOD AND APPARATUS THEREFOR
12 Claims, 13 Drawing Figs.

[52] U.S. Cl. .................................................... 219/125, 219/60
[51] Int. Cl. ..................................................... B23k 9/12
[50] Field of Search ......................................... 219/124, 125, 60, 60.1, 61, 137, 126, 73, 76

[56] References Cited
UNITED STATES PATENTS

| 3,084,244 | 4/1963 | Rieppel et al. | 219/60 |
| 3,135,850 | 6/1964 | Scheller et al. | 219/60 |
| 2,079,265 | 5/1937 | Trainer | 219/60X |
| 2,428,161 | 9/1947 | House | 219/130 |
| 2,906,852 | 9/1959 | Cornell et al. | 219/61 |
| 3,009,048 | 11/1961 | Stanley | 219/60 |
| 3,081,014 | 3/1963 | Anderson et al. | 226/195 |
| 3,126,471 | 3/1964 | Nelson | 219/60.1 |
| 3,264,445 | 8/1966 | Arnold | 219/76 |
| 3,268,708 | 8/1966 | Thomas | 219/125 |

Primary Examiner—J. V. Truhe
Assistant Examiner—L. A. Schutzman
Attorney—Edwin M. Thomas ABSTRACT: An automatic system for clamping and welding metal members together along a joinder line employs quickly removable and interchangeable replaceable cartridge welding units. Each unit comprises a miniature frame structure, carrying its own supply of consumable electrode wire, with feeding mechanism therefor, a welding head, and means for maintaining close control of electrode feed rate and tension. Means are provided to automatically vary the head angle of electrode projection towards the weld. The system is designed especially for single pass internal pipeline welds, but may be used for other operations.

PATENTED DEC 29 1970

INVENTOR
JEROME W. NELSON

BY Edwin M. Thomas
ATTORNEY

AUTOMATIC PIPELINE WELDING METHOD AND APPARATUS THEREFOR

BACKGROUND

Numerous proposals have been made in the past for welding various tubular members together, such as pipelines, by automatic or semiautomatic methods. Welding large diameter pipelines and analogous structures, of 30 to 36 inches diameter and greater, by automatic mechanism presents many problems which have not hitherto been fully solved, as far as applicant is aware.

Pipeline construction in the field must move along rapidly to be competitive. A prime requisite for successful automatic welding, therefore, is that all the equipment, including the automatic welder, be able to keep up reasonably well with a rapidly advancing pipeline crew. The crew normally is equipped with pipe handling mechanism, trenching equipment, equipment for wrapping and/or coating the pipe, backfilling equipment, etc. The whole outfit is designed to move rapidly, but a serious obstacle in the past to efficient speed in building pipelines resides in the difficulty of making the welding joints.

This is particularly true with respect to the first pass or "stringerbead" welds, i.e. those made first to secure the joints together with a weld strong enough that the clamping devices, etc., can be moved on down the line. Each pipe joint, of course, must be securely fixed to the previous joint, or to the installed line, before another joint can be attached. Otherwise, there can be serious misalignment and other fabricating problems. Once the sections are properly and firmly joined, however, the rest of the crew can go on to the next section of pipe, whether the weld is completely finished or not. Thus the line as a whole can advance, even though some finish welding may be left at the joints to be completed later by manual or automatic means, as is best suited to the job.

The present invention involves a unit mechanism and a process for using it to form strong girth welds in large pipelines, etc., automatically. While specifically designed for internal welding it is not always or necessarily limited thereto. With minor changes it can be mounted in or on external clamping apparatus and used for external welding. Most prior art systems have dealt with external welding of girth joints in pipelines or the like. Suggestions have been made for internal welding of such joints but, as far as the present applicant is aware, no successful automatic or semiautomatic system has been devised for doing so. A recently suggested system is designed by the present applicant to hold two sections of pipe in alignment with rigid internal clamp means, without rotation and in end-abutting relationship, while performing an interior weld around the girth joint. The welding mechanism is supported on and guided by the internal clamping mechanism which otherwise is of more or less conventional type. That system preferably uses a gas shielded consumable electrode, i.e. a slender consumable wire, although other types of electrode and/or of welding techniques may be used according to some aspects of the invention. The weld made from the interior of the pipe may extend through only part of the pipe wall thickness and the weld may subsequently be completed by one or more additional welding passes inside or outside the pipe. The invention is concerned mainly, however, with forming a good sound initial single pass internal weld.

In the present invention one or more orbitally movable welding units are installed in or on an internal carrier, track or guide mechanism. Each unit may carry its own supply of consumable electrode, e.g. in the form of a coil of wire, and each unit or cartridge is equipped with means for feeding and guiding the wire to the arc. Appropriate means are provided for supplying a shielding gas and the necessary electric current. The system is designed to move one or preferably more welding or arc-forming units orbitally around the joint to be welded. A typical unit is designed to weld about one quarter of the joint circumference in a unidirectional pass by a single head. The rest of the weld may be completed by the same or with other welding heads; this arrangement may be varied. A single welding head or orbital movable unit may perform in some cases a complete internal weld by passing around the periphery of the joint, for example by going first 180°, or slightly more, in one direction and then reversing to the starting point and moving on to complete the weld in the other direction. Two welds may be produced, one in each directional sense, if desired, by each welding head. In other obvious arrangements, a greater number of welding heads or welding units may be used; the specific design described herein uses one for each 90° of arc, with two heads firing and two idle on each stroke. Theoretically it should be possible to weld through 90° of arc, with all four welding units firing simultaneously to complete an inside peripheral weld in a single 90° pass. There are several practical difficulties and the system described below is preferred at present.

In any of the cases just described, the welding unit per se must be one which serves effectively to initiate a good weld and make it continuous from start to finish. Whether the continuous stroke or phase for a given unit or head extends through only 90°, or through 180° or through some other angle, each segment of the weld should be continuous and the ends of the separate weld segments should be properly connected together to make a complete and satisfactory weld around the entire periphery.

The apparatus described thus requires one or more small "package," i.e. removable and interchangeable welding units which can be taken out and replaced bodily. Alternatively, a unit may be merely inspected and/or replenished with a supply of expendable welding wire, and returned to service without serious interruption of the welding job.

A related invention is described in some detail in a copending application filed by the present inventor and Eugene F. Sims on Jan. 12, 1967, Ser. No. 608,872 now U.S. Pat. No. 3,428,330. The apparatus described there includes an internal clamping mechanism which holds the pipe joints firmly in alignment, at least while a first pass internal weld is made. This application discloses a welding means which is orbitally movable inside the pipe to produce a single or multipass weld.

A particular object of the present invention is to design a better and more reliable replaceable cartridge welding unit which can readily be taken out or installed or replaced in the field with minimum delay.

Particularly when the welder is inside of the pipe, the welding unit must necessarily be rugged and reliable. Also, because large girth joint welding consumes welding wire and related material rapidly, and because there is some inevitable corrosion of the contact tube and other parts during prolonged arc welding, the individual welding units should be easily and readily removable for inspection and reloading, for reconditioning, and/or for replacement when such is needed. Frequent replenishment of the consumable wire electrode is necessary, even if no other problems arise. The present invention is concerned, therefore, with simple and convenient means for replacing a wire supply spool in the cartridge and also with the feeding means and guiding means for it. It includes means for maintaining proper tension and guidance for the wire, and delivering it to the arc at a controlled and accurate feed rate. It involves means for coordinating the various movements by which the welding electrode is supplied to the arc without objectionable distortion or misalignment.

Achievement of the foregoing general objects necessarily requires solution of a number of problems. Depending on the welding procedure, the effect of gravity on the molten weld pool, etc., the projection angle at which the welding head or contact tube is directed with respect to the line of the weld requires change or adjustment from time to time, or from point to point around the weld periphery. In making such an adjustment, the position of the arc itself, with respect to the apparatus or the point of welding, should not be shifted to any substantial degree. Spacing of the end of the wire electrode from the parts to be joined as the wire is burned off, as well as alignment of both the electrode and the pipe ends or abutting surfaces are necessarily critical. Wire fed from a spool or coil has an initial cast which should be kept oriented in the same way throughout a welding operation to prevent deviations from a desired welding path.

The present invention employs a special mounting arrangement for the welding head by which the position of the arc can be kept substantially fixed in space with respect to the carrier, which of course travels in an orbit, even though the angle at which the electrode is projected into the arc, i.e. the projection angle of the welding head, can be varied considerably as may be required.

The direction and rate of projection of the wire electrode itself must be kept under close control. The cast or directivity inherent in the end of the wire fed from a coil, as it is projected through the contact tube into the arc where it burns off, can cause trouble if it changes from time to time. It is highly important that the wire electrode, with its normal cast or tendency to curvature, be handled, directed and fed so that it always projects in the same direction, as far as possible. Even though the wire has an inherent cast as it is unreeled, this can be tolerated if the wire is always oriented in the same plane or direction with respect to the geometry of the joint being welded. The wire drive means must feed positively but not make new curves or crimps in the wire. Wire guides also are designed to avoid imparting a new cast of their own.

The rate of feed for the wire electrode also must be steady, dependable and properly controlled and coordinated with the orbital speed of the welding arc. In some cases the rate of wire electrode feeding is made selectively adjustable. In any case the drive must be highly positive and nonvarying in its advancement and control of the wire. A grooved or knurled wheel or roller preferably is used to assure proper gripping of the welding wire and positive feeding to the arc. Such is another object of this invention.

Since all the mechanism so far discussed may be used inside the pipe, for internal welding and in conjunction with a strong and rigid pipe clamping system, space necessarily is at a premium. Hence the wire feeding mechanism, the wire supply itself, and all the elements associated therewith must be highly compact, but strong enough to perform their functions properly, and efficiently mounted. At the same time the whole unit is designed to permit ready replacement of wire, or of a complete unit, for the reasons already indicated. To meet these needs is a further object of the invention.

The welding units of the present invention must be capable of being mounted in the circular frame of a more or less conventional clamping structure. The clamping structure ordinarily must be retractable and capable of being inserted into the pipes or tubes to be welded. Thus the welding mechanism per se also must be retractable to an inoperative position, at least while the clamp structure is being put in place. Accordingly, the present invention also includes provision for retracting the welding structure or for moving it into and out of operative position, as required.

In order to maintain a steady wire feed rate and avoid tangling of the wire due to partial uncoiling at the reel, the invention also includes means for preventing backup or loosening of the wire on the supply reel. This involves means for shifting the reel itself so as to keep constant the length of wire between its supply reel and the feed rollers, regardless of shifts of the latter necessitated by the changes in projection angle of the welding head, as mentioned above.

A further object is to establish a relatively fixed arc position in space by use of parallel linkages which permit adjustment of the projection of the welding head, and of the consumable wire electrode which feeds through it, along with other mechanism, without substantial displacement of the arc.

Further objects will appear from the detailed description of preferred embodiments below.

PREFERRED MODIFICATION

Figures 1, 2:
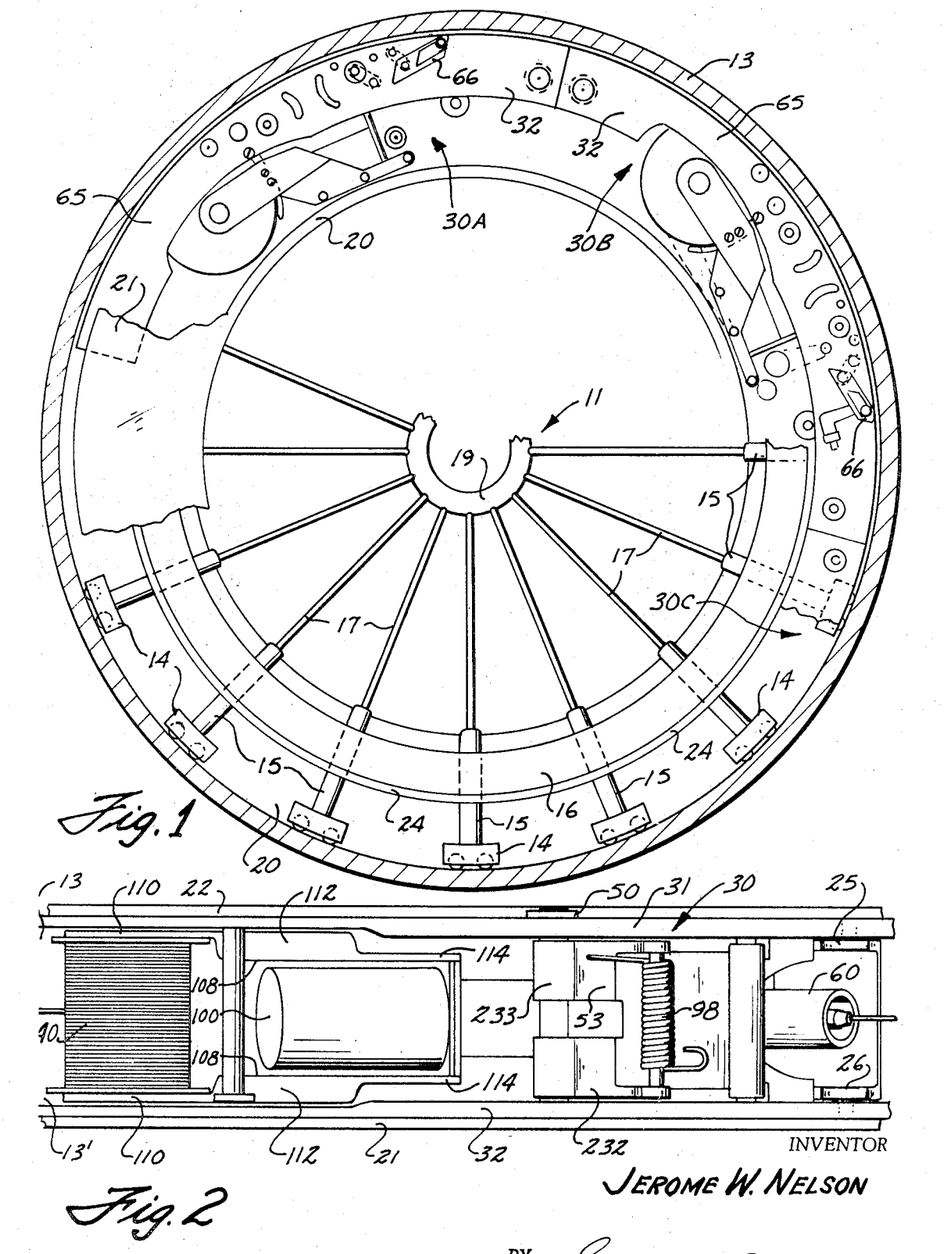
FIG. 1 is a general and partly diagrammatic front elevational view, with parts in section and other parts omitted, of a clamping and welding machine employing replaceable cartridge units which are an important aspect of the invention.
FIG. 2 is a top plan view, on a larger scale, of one of the cartridge units of FIG. 1, with some parts broken away.

FIG. 1 shows a general view of a pipe clamping mechanism 11 which is inserted in a first section 13 of large diameter tubing, such as a large steel pipe of the type used for building pipelines for the oil and gas industry. Another section of pipe is to be attached to section 13 by a girth weld.

This clamping and welding apparatus, as a whole, is supported on rollers or other carriage mechanism for movement along and within the pipeline. In ordinary use it will be moved to the open end of the line, the mechanism will be aligned accurately with the end of the pipe, and the clamping shoes for that pipe end will be expanded to hold the apparatus firmly in that aligned position. Thereafter, a new section or joint of pipe will be set in place with one end abutting the end of the first pipe, and another set of clamping elements, not shown, will be expanded to hold the new section firmly in place. Then welding takes place by moving one or more, preferably four, cartridge units in an orbital path around the joint.

It will be understood that in certain aspects of the invention the clamping mechanism may also, or alternatively, be outside of the pipe and so arranged that one or more welding cartridge units can be propelled in an orbital path around the outside of the joint to form an external weld. The detailed description herein, however, will be limited to internal clamping and internal welding, which are presently preferred for several reasons. Among these reasons are the greater ease and accuracy of internal alignment, the freedom of movement of mechanism along the pipeline without such obstacles as blocks, cribbage, etc., and the accuracy with which internal mechanism can be aligned with the circumferential joint.

The clamping mechanism includes a plurality of conventional clamping shoes 14, of which some are shown in FIG. 1. These are mounted on slidable plungers 15 supported for smooth sliding movement radially in and out by a guide ring 16. These plungers are moved to clamping position in any suitable manner, e.g. by rods 17 operated by toggle and/or hydraulic or pneumatic means of conventional type. This mechanism is represented generally by hub 19.

Mechanism is provided for propelling and guiding all the cartridge welding units, designated 30 in general, around their orbital path inside the joint to be welded and between the front and rear rows of clamping shoes. The rear shoes 14, FIG. 1 grip pipe 13, and a similar front set grip a new pipe section to be attached. Means not shown herein are provided to align the plane of orbital travel of the welding unit or units with the plane of the joint, i.e. the normally vertical plane where the pipe ends to be welded come together.

The carriage and guiding mechanism comprises a channel shaped ring 20 having side plates or flanges 21, 22 between which each cartridge welding unit 30 is mounted. This ring is adapted to be driven to rotate about the axis of the tube 13. The drive means are not shown herein, but they are arranged to move the welding units in both rotational directions and far enough that segmental welds made by each unit will join together with others for a complete peripheral weld around the joint. That is, the channel-shaped ring 20, 21, 22 rotates with respect to the clamp structure and carries the welding units 30 with it. In the description which follows, it will be assumed that four welding cartridge units 30A, 30B etc., will be used. In the preferred system, two of these units, located for example in the first and second quadrants of a circle proceeding clockwise from the top of the circle, are first operated through an angle of 90°, and slightly more to provide weld overlap. These two units are then returned to their starting positions and two other similar units, starting at other points, are moved through 90° in the opposite direction to complete the full peripheral weld, i.e. complete single pass weld. Supplemental internal and/or external weld passes may be made, as and if needed, to complete the welded joint. This invention is concerned primarily with making the first complete annular weld, or "stringerbead." However, it may be used also for supplemental weld passes.

Each of the cartridge welding units 30 comprises a light but adequately strong framework structure made up of a pair of spaced and generally similar parallel arcuate side plates 31, 32 secured rigidly together by transverse block or spacer elements 33, 34. See FIGS. 2, 3, 5 and 8A. The side plates 31 and 32 are formed to receive bearings, etc. which support a number of pivoted and other movable parts, including pivotally mounted parallel arms for the angularly adjustable welding head, wire electrode feeding mechanism which can be shifted, and a wire electrode supply reel and a trailer carriage therefor which can be moved back or forward to pay out or take up slack as the feeding mechanism is shifted. These various movements are caused and controlled by one or more cam followers, such as 50, FIGS. 3 and 5, which cooperate with cam surfaces represented in general by dotted line 55, FIG. 5.

Thus each welding unit 30 comprises a movable trailer carriage for a spool or reel 40 of consumable electrode wire, a feed mechanism and drive means for feeding the wire to a movable welding head 60, means for guiding the wire in such a way as to keep it under close control without unwinding or spiraling, and means for supplying the necessary welding current or power, shielding gas, etc., to the welding head. It includes means for progressively varying the projection angle of the welding head (or the angle of incidence of the wire electrode) without substantially changing the spatial position of the arc with respect to the unit framework.

Figure 3:
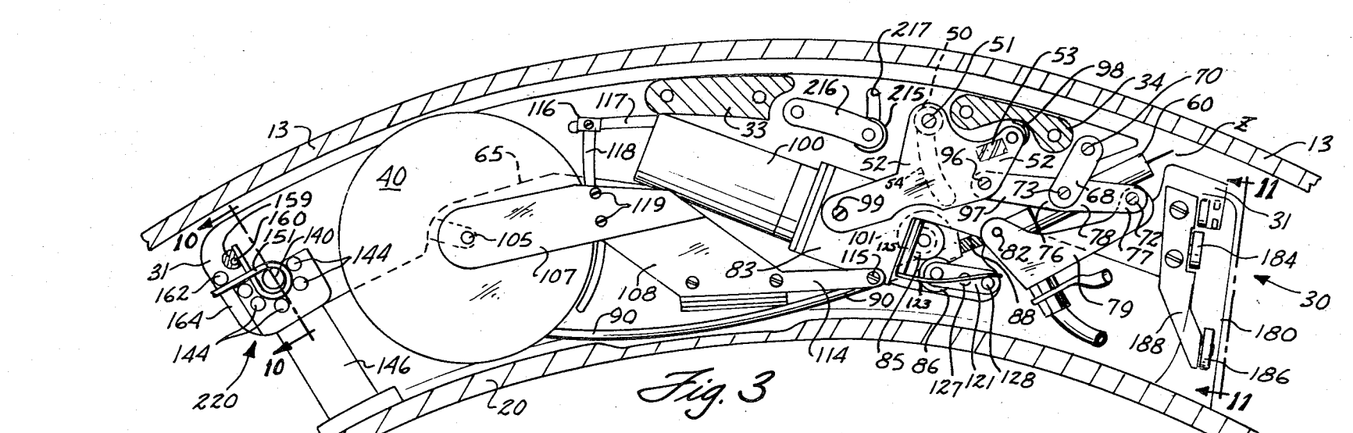
FIG. 3 is a side view of the unit of FIG. 2.
Figure 5:
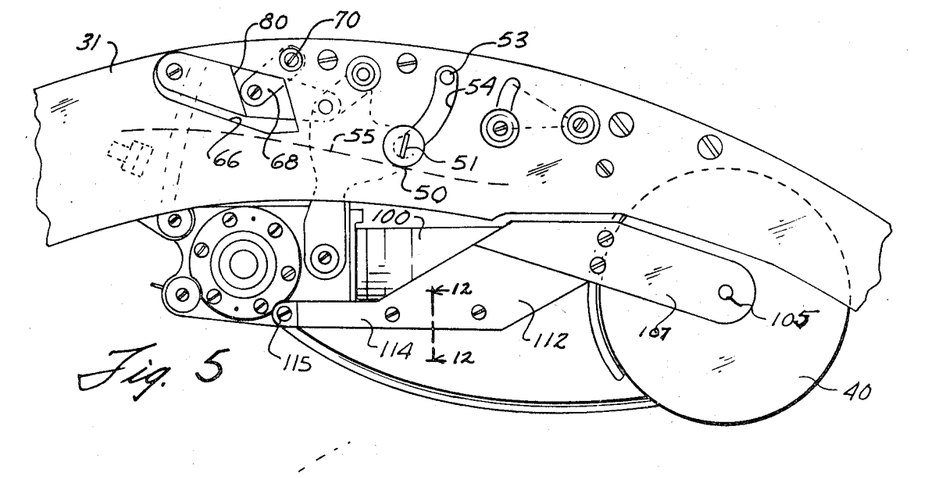
FIG. 5 is a view of the apparatus of FIGS. 3 and 4 from the opposite side.
Figures 6, 10:
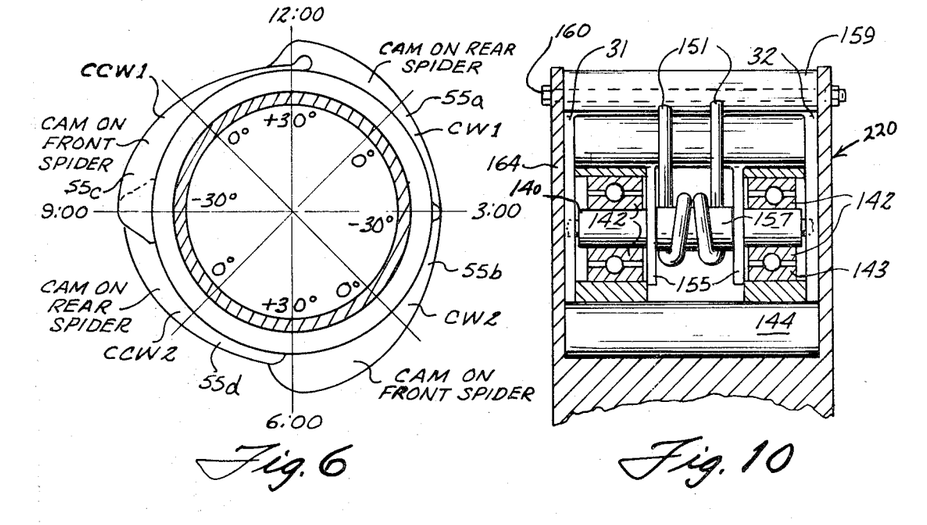
FIG. 6 is a diagrammatic view of a welding system, illustrating certain method aspects of the invention.
FIG. 10 is a detail sectional view taken substantially along line 10–10 of FIG. 3.
Figure 9:
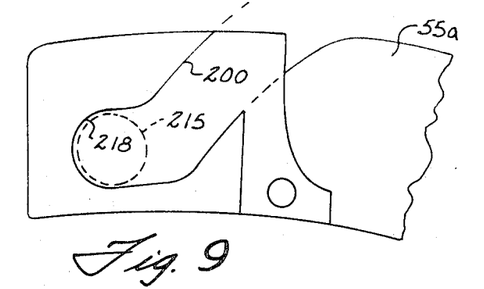
FIG. 9 is a side view of a supplemental cam element.
Figure 11:
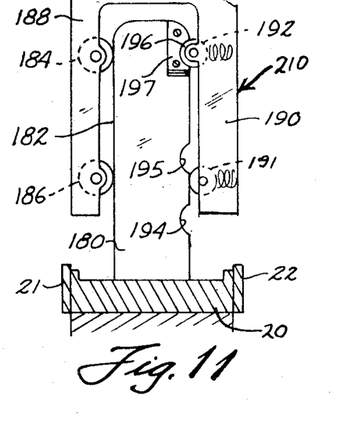
FIG. 11 is another detail view, showing a latching mechanism and taken substantially along line 11–11 of FIG. 3.

Means are provided also for moving each cartridge unit 30 to a "home" position, whereupon further movement and operation of a supplemental cam 200, FIGS. 5 and 9, unlatches the cartridge from latching means 210, FIG. 11, so that it can be raised about and withdrawn from a pivot mechanism 220, FIGS. 3 and 10, for lifting out of the apparatus. The cartridge can then be cleaned, loaded with a new reel or spool of wire, etc., and replaced, or another similar unit can be installed in its place, as described more fully below. Changing of cartridges in an internal welder can only be done, of course, when the clamp unit is pulled at least part way out of the pipe line.

Figure 7:
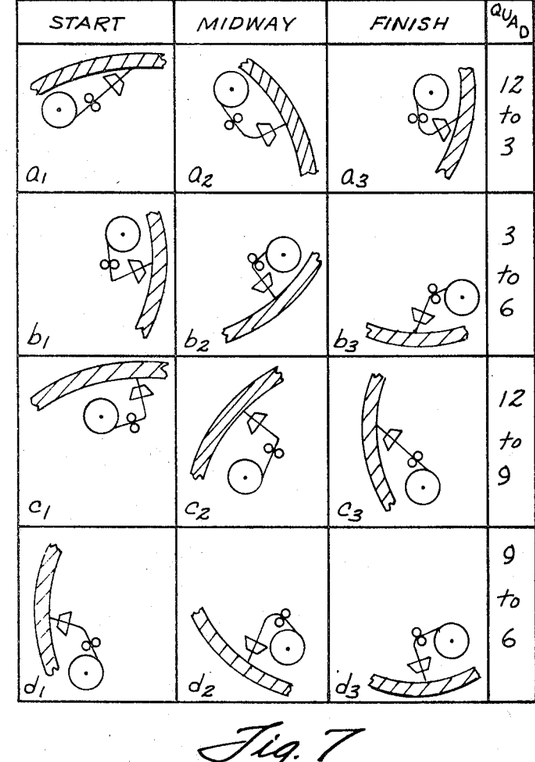
FIG. 7 is a series diagram showing relative positions of various elements in different welding quadrants, according to certain method aspects of the invention.

Before proceeding further with a detailed description of mechanism, it will be helpful to describe method aspects of the invention by reference to FIG. 7. Starting clockwise from the top of a joint to be welded, four quadrants involve respectively the twelve to three o'clock, three to six o'clock, six to nine o'clock and nine to twelve o'clock positions. Since molten metal at an electric welding arc (or in any process that fuses the metal) tends to run down by gravity, the control of this molten pool usually presents a problem. Control is best accomplished, according to the present invention, by changing progressively the projection angle of the welding head as it moves around the joint with respect to an instantaneous radial line at the point of the weld. Experience has shown that in the twelve to three o'clock quadrant, this angle should start with a lead of about 30° with respect to such a radius, decrease to about 0° (i.e. become radial) at about the 1:30 o'clock position, and to a −30° angle, lagging at the three o'clock position. These angular positions are shown in the first line (top row) of FIG. 7 as items $a_1$, $a_2$ and $a_3$.

In the second quadrant, 3 to 6 o'clock, as shown in the second line, FIG. 7, the wire changes from a lagging angle, about −30°, to zero at 4:30 o'clock position and to a leading angle of about +30° at the bottom of the pipe (six o'clock position). See items $b_1$, $b_2$ and $b_3$.

In the fourth quadrant, twelve to nine o'clock, the positions are taken in counterclockwise order since experience has shown that welding is better accomplished in a downward direction. The wire electrode starts with a lagging or about −30° position at the top or twelve o'clock position. At 10:30 it is approximately zero and at nine o'clock position it is a leading angle of about +30°. See items $c_1$, $c_2$ and $c_3$.

In the third quadrant welding proceeds from the nine o'clock position, with the wire at about a +30° leading angle, shifts to about zero at the 7:30 o'clock position and to a lagging angle of about −30° at the six o'clock position. See items $d_1$, $d_2$ and $d_3$. It will be understood that the terms "leading" and "lagging" are merely arbitrary. As used herein, "leading" means approaching a radius line from its counter clockwise side (i.e. projecting in a direction clockwise ahead of the radius) and the opposite for lagging.

In order to accomplish the shifts required for these angular changes, there is provided on each unit or cartridge 30 a cam follower 50, which is ball bearing mounted on a pin 51 projecting from a rocker plate 52. There are two similar rocker plates 52 which are fastened rigidly together by a spacer block 53. Plates 52 are mounted for pivotal movement inside of the side plates 31, 32, the cam follower 50 being outside of plate 31, FIGS. 2 and 5, with pin 51 passing through an arcuate slot 54 in side plates 31. The position of the pin 51 in slot 54 is determined by their position along a stationary cam element 55 (or 55a, 55b, etc.), FIGS. 5, 6 and 8.

Assuming that four welding units are used, (see FIGS. 6 and 7) two of them preferably are arranged to fire simultaneously during their welding stroke. For example, welder units in the first and second quadrants, respectively, FIG. 7, may start welding as the mechanism moves clockwise, as at $a_1$ and $b_1$. During this time the welder units in the other two quadrants are idle. Under control of cam surfaces 55a and 55b, FIG. 6, the cam follower 50 in the first quadrant, designated clockwise (cw) arm No. 1, gradually moves from its initial high position at the top on cam surface 55a to the low cam position at three o'clock. See also FIG. 5, dotted line 55.

Figure 4:
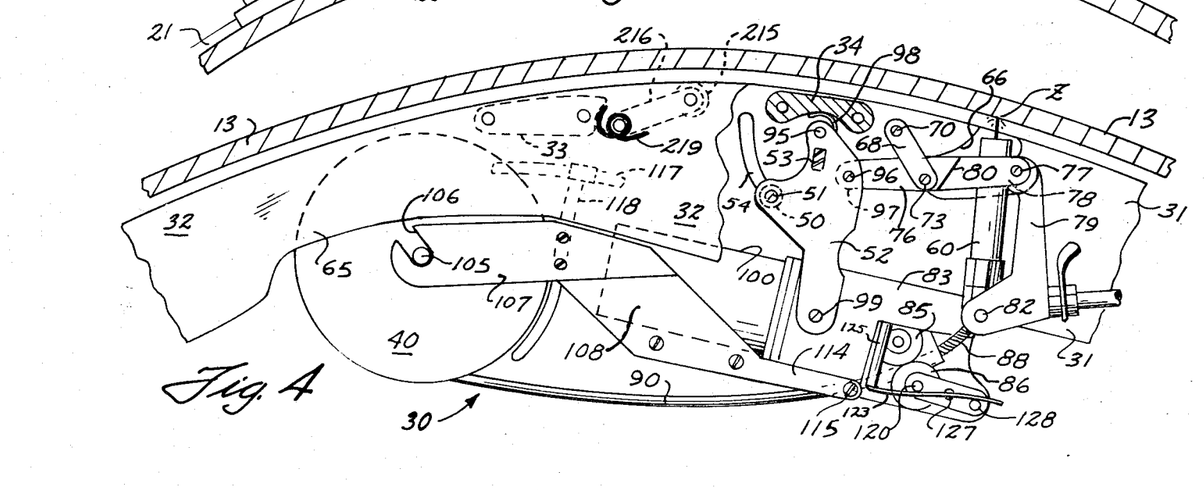
FIG. 4 is another view, generally similar to FIG. 3, showing certain parts in altered positions.
Figure 8:
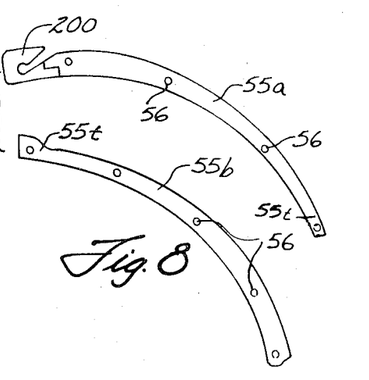
FIG. 8 is a plan or side view of certain cam elements used in the invention.

Meanwhile, the cam follower in the second quadrant, i.e. in cw arm No. 2, starts rising on cam surface 55b from a low position at three o'clock to a high position at six o'clock. During this movement, its cam follower 50, FIG. 4, moves from its lower or 60° position in its slot 54, as shown in FIG. 4, to the raised or 0° position, shown in FIG. 3, whereas in the first quadrant the rocker arm is moving reversely or from 0° to 60° in slot 54. Two cams 55a and 55b, detached from their mountings for clearer showing, are illustrated in FIG. 8. They are mounted on the stationary clamp structure beside the unit welder frames by bolts through holes 56. The number and arrangement of cams, and their specific design, will depend on the number and arrangement of heads and the angles through which each needs to be stuffed. This angle may vary with each head as well as with its position.

After clockwise welding movement of about 90° is completed in the first two quadrants, welding of the right half of the joint as seen in FIGS. 1 and 6 being accomplished, all the units are returned by a 90° counter clockwise movement to their home positions. Then the units at the left, counter clockwise unit CCW1 in the fourth or twelve to nine o'clock quadrant, start firing. As they do so, cam follower on CCW 01 starts rising on cam surface 55c whereas cam follower on CCW 02 starts falling.

The conventional clamp mechanism which supports the ring 16 carrying the carriages for the welders, has a rear spider unit for holding the first or installed pipe section and a front spider unit for holding the new section to be added. The cams are attached to either of these spiders, as is most convenient. Cams for the first and third quadrants are shown as attached to the rear spider and cams for the second and fourth quadrants are attached to the front spider. However, other arrangements can be used. The various cam surfaces are not necessarily identical. They are shaped to meet specific head angle needs of the various sectors. They are attached to the spiders so as to avoid interference with each other.

Referring now to FIG. 1, two complete units or cartridge arms 30A and 30B are shown near the top, additional units being provided for other sectors. Part of a unit 30C is shown. Two units may suffice in systems designed to permit substantial flexing of the necessary utility lines, i.e. electric supply line, gas line (and water line when cooling is desired). With only two heads, each may be passed through 180° (or slightly more to provide a small overlap). Each head, in this case, starts at the top of the joint and moves around to the bottom, the head at the right preferably moving clockwise and the other moving counter clockwise. In this case only two cams, each of 180° extent, will be used.

Whether four units are used, each for welding one quadrant, or two units each welding a half circle, the cam elements are so designed and located so as to give the guidance needed for setting the proper head angle, according to FIGS. 6 and 7. The cams, in any case, are positioned, of course, so as to start and stop the movement of their follower elements at the right times and places. The cams shown diagrammatically in FIG. 6 each extend operationally for 90°, plus a small overlap for closing the weld. However, this arrangement can and will be varied for other arrangements to meet the welding head angle shift needs in all parts of the circumference of the weld.

Each welding unit is framed by the side plates 31, 32 as mentioned above, together with the necessary rigid cross members, to make a removable cartridge welding unit containing a pivotally movable welding head, bodily movable wire feeding and guide means, and a bodily movable wire supply reel. All these are mounted for the desired relative shifts in position described above. As best seen in FIGS. 2, 4 and 5, the arcuate side plates 31 and 32 are made as thin as practicable, consistent with requisite strength. To accommodate shifting of the wire reel, each plate has a notched or narrowed trailer portion 65. Both are provided with holes for attaching or pivoting various parts and with cut away portions 66 to accommodate certain wide elements at the welding head. The reason for this is to give as much room as possible to dissipate heat. A typical plate 31 is shown also in FIG. 8A.

The whole assembly otherwise is made as narrow as possible so as to minimize the required spacing between front and rear sets of clamping elements. It is desirable to clamp the pipes as near their ends as is practicable. At the same time each unit must carry an adequate supply of expendable welding wire to run for a reasonable time without replacement.

A pair of short parallel pivoted link elements 68 are pivoted at points 70 to the inside faces of the respective side plates 31, 32. At their free ends 73 these links pivotally support the mid portions of a pair of parallel swinging bars 76 which have cantilever ends 78 extending to the right as seen in FIGS. 1, 3, 4 or to the left in FIG. 5. To these cantilever ends 78 are pivotally secured at 77 the outer or upper end of a roughly L-shaped plate 79 which has a channeled cross section. Each bar 76 is offset at 80, FIG. 5, the part opposite the welding head 60 being set out to swing in a notch 66 in the side frame. This allows more space for air to circulate around the welding head and prevent excessive heat buildup. The opposite end of plate 79 is pivotally attached on either side at 82 to a swinging frame 83 which houses a wire feeding and guiding assembly. Frame 83 supports a driven feed roller 85 in roller bearings, a cooperating wire gripping roller 86 mounted on a pivoted arm 121, a spiral wound wire guide tube 88, and the forward end of a plastic nonconductive wire guide tube 90. The wire contacting parts are mounted in appropriate electrical insulators.

The rocker plates are pivoted to side frames 31, 32 at a point 95 which constitutes the radial center of the arcuate slot 54. At a point 96 distant from point 95, equal to the net length of links 68, plates 52 are pivotally attached to ends 97 of the parallel swing bars 76. Also, the rocker plates 52 are pivotally attached at 99 to the swinging wire drive frame 83 mentioned above. The arrangement is such that the distance between pivot points 77 and 82, FIG. 4, and the distances between points 82 and 99 are equal respectively to distances between points 96 and 99. Furthermore, the distance between points 96 and 73 is equal to that between points 95 and 70 and the distance between point 77 and point Z, where the welding arc is formed at the tip of the wire electrode, is equal to the distance between points 70 and 73, and to that between 95 and 96. The distance between points Z and 70 also is the same as between points 77 and 73. Hence, these pivoted swinging members all constitute parallelograms, all arranged so that no matter how they are shifted in position the spatial position of the arc or wire burn-off point, with respect to the unit 30, is not changed. However, the projection angle, i.e. the angle at which the wire approaches point Z, can and does change. A torsion spring 98, FIG. 2, holds follower 50 against its cam.

The suspended frame 83 supports the feed rollers 85, 86 and also supports a high speed electric motor 100 which drives the wire feed roller 85. This drive is through a planetary speed-reducing gear and bevel gearing 101, FIG. 3, so dimensioned and offset as to locate the axis of the motor essentially in line with the point of bite between the feed rollers 85, 86 where the wire passes through. The electrode feed rollers are insulated from the frame, being driven through electrically nonconductive parts. The wire guides also are insulated from the frame and motor. These are obvious and well known requirements in feeding consumable electrode wire to an electric arc.

Figure 12:
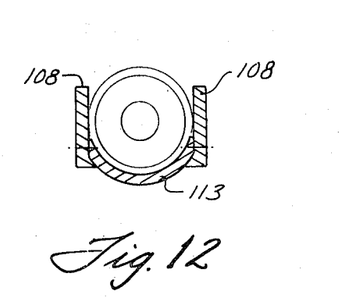
FIG. 12 is another detail sectional view taken substantially along line 12–12 of FIG. 5.

A nonconductive wire supply reel or spool 40, made of plastic or reinforced resin, is mounted with its axle 105 fitted into support notches 106 in the rear ends 107 of a wire supply trailer frame. The latter consists of a pair of parallel and stereo-similar frame elements 108. Each of these has a rearwardly projecting bar 107, made as thin as convenient, to accommodate between side frames 31, 32 as wide a spool as possible. Bars 107 are integral with thicker plate elements 112; see FIG. 2. A curved bridge plate 113, which forms a nest for the motor 100 in the positions shown in FIGS. 4 and 5, secures plates 112 together through screws 109. See FIG. 12. Projecting downward and forwardly (to the right as seen in FIGS. 1, 2, 3 and 4) are two arms 114, integral with plates 112, which are pivotally attached at 115 to the movable wire drive frame 83. The arrangement is such that the trailer frames 108 can pivot about point 115 but must move forward or backwards as the cam follower 50 moves up or down and shifts frame 83 forward or backwards. The purpose of this arrangement is to maintain a uniform distance at all times between the wire reel and the point where the wire is gripped by the feed rolls 85, 86. Since the guide tube 90 runs from the reel 40, or a point near the reel, past and in line with the pivot point 115, the length of wire from reel to feed rollers does not change appreciably, no matter how the welding head is rotated around pivot point 82. In effect, any slack in the wire is taken up or paid out automatically. Also, the arc or wire burn-off point does not change, as previously explained. Furthermore, the spring wire tube 88 guides the wire from the feed rollers to the welding head 60 through or essentially through pivot point 82. Hence, there is no substantial change in the length of the electrode wire from the feed rolls to the arc, regardless of any shift in angular position.

The trailer frame elements 112 are guided in their forward and backward motion by a pair of nylon or "Teflon" slider elements 116 which ride in grooves 117 in the side plates 31 and 32. These sliders 116 are pivotally attached to a plate 118 secured between members 112 by screws 119.

The result of all this is that the position of the arc is fixed in space with respect to the framework of each welding unit. The whole unit moves in an orbit and the welding head moves too, but the relationship between point Z and the framework 31, 32, etc., does not change to any measurable degree.

Mention has been made of means for applying a gripping tension to the wire feed rolls. The nondriven roller 86 is mounted cantilever fashion on a pin 120 fixed in a rocker arm 121, FIGS. 3 and 4. The pin 120 also projects outside of the arm 121 far enough to be engaged by the flat side of a stiff leaf spring 123. The latter is pivotally mounted to swing laterally on a pin 124 which screws into the bottom of an insulated post 125 fixed to the shiftable frame 83.

Rocker arm 121 is pivoted near its midpoint to frame 83 by a pin 127 which allows the arm to swing, if not obstructed, in a vertical plane. At its outer end, arm 121 bears an outwardly projecting pin 128. The leaf spring 123 projects far enough beyond pin 128 that an operator can grasp the end of it, flex it upwardly enough to clear pin 128, which has a slight head or flange on it, and then swing the spring laterally around its pivot 124. The middle part of spring 123 thus slides off projecting pin 120, freeing arm 121. This allows the roller 86 to swing freely away from its normal wire gripping position with respect to driven wire feed roller 85. In this position, the knurled feed roller 85 is open for inspection, etc.

When the spring is replaced by first engaging it under pin 120 and then over pin 128, the spring becomes a double acting tension medium, due to its middle portion pressing upwardly on pin 120 and its outer portion pressing downwardly on pin 128. Both forces tend to swing arm 121 clockwise (as seen in (FIGS. 3 and 4), applying double force to hold the grip roller 86 against feed roller 85.

At the end of each of the cams 55a, 55b, FIG. 6, see also FIGS. 5 and 8, a terminal portion connects to a supplemental cam 200, FIG. 9, designed to perform another function when the welding unit is carried beyond its normal stop position. This function is to unfasten the free end of the unit cartridge so as to make it possible to lift it out of its carriage or out of the clamp structure. This will now be described.

The left end of a cartridge unit 30, as seen in FIG. 3, is provided with a pivot pin 140 secured at both ends to side plates 31, 32, on which a pair of ball bearing races 142 are mounted. See FIG. 10. The outer ring 143 of each race fits into a cage of hardened dowel pins 144 mounted rigidly in the clamp frame. Dowels 144 are mounted in a pivot block 146 secured to ring 20 of the clamp frame. The arrangement is such that the left end of the arm or unit 30 can be inserted into the cage 144 by lowering its left end, then moving to the left. It can be withdrawn by moving to the right, FIG. 3, as long as its right end is free.

Mounted in the left end of the cartridge arm unit 30 are two stiff left and right but otherwise similar coil springs 151, only one of which is seen in FIG. 3. These springs are located around shaft 140 and prevented from moving laterally by washers or spacers 155 between them and the ball bearing races on either side. A hollow spacer sleeve 157 holds the springs concentrically around shaft 140. These springs are preloaded by having their upper ends (as seen in FIGS. 3 and 10) constrained clockwise by an eccentric pin 159 and their leftward ends (FIG. 3) constrained counter clockwise by the same pin. This pin can be turned to various positions to adjust the preloading, and locked in place by bolt 160, the ends of the pin being pivoted in side plates 31 and 32.

When the arm is raised at its right end and inserted into the cage of dowel pins 144, there is no resistance to this insertion by the springs 151. However, as the arm is hinged downwardly about this pivot, the left lateral ends of the springs 151 are picked up by a transverse shaft or pin 162 mounted between arms 164 projecting from the pivot block 146. As the arm is lowered still further, e.g. to the dotted line position D, FIGS. 3 and 8A, pin 159 engages 3 and 8A. The springs 151 resist this movement and are loaded further as the arm is lowered to the full line position shown in FIGS. 3, position $D_1$, FIG. 8A. This is the welding position. the other end of the arm 30 can be lowered still further, below welding position $D_2$, FIG. 8A, to an inner retracted position to get it out of the way during alignment of the clamp, insertion into the pipe, etc. This is the full line position shown in FIGS. 8A and 3.

Figure 8A:
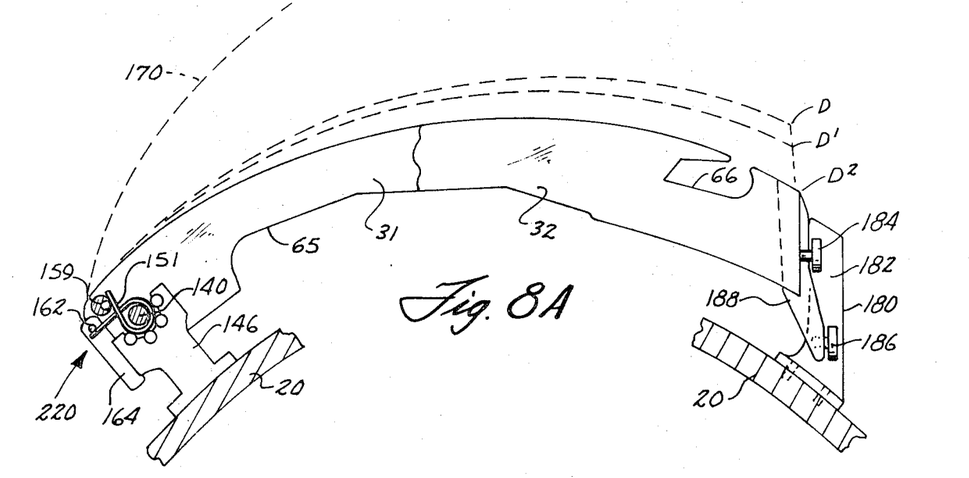
FIG. 8A is a similar view of one of the side frames.

A restraining means to hold the arm in either the inner or retracted position $D^2$ or in the welding position $D^1$ is shown in FIGS. 8A and 11, as well as in FIG. 3. It includes a block 180 secured to the annularly movable carrier ring or base 20. Block 180 has an accurately aligned and smooth forward side 182 on which a pair of spaced and fixed guide rollers or followers 184 and 186 can ride. These rollers are mounted in a bracket 188 secured to the cartridge frame side plate 32, FIG. 8A. This is shown fragmentarily in FIG. 3. Position $D^2$ is used during alignment of the apparatus within the pipe to hold the welding head and associated parts well out of contact with the pipe wall. Means are provided to hold the arm in either position $D^1$ or $D^2$.

Across the block 180 from the relatively fixed rollers 184, 186 and secured to the cartridge side plate 31, is a bracket 190 carrying a pair of spring mounted rollers or cam followers 191, 192, FIG. 11. The lower roller 191 is adapted to engage resiliently in latching surfaces 194 or 195 in the right side, FIG. 11, of block 180. These are for holding the arm in retracted position $D^2$. An upper notch or latching surface consists of a roller-fitting depression 196 in a relatively adjustable block 197 secured to block 180. This is made adjustable for precise locating of the welding head position $D^1$ with respect to the joint to be welded. Roller 192 engages depression 196 for welding position while roller 191 rides on the smooth surface 193 between detent surfaces 194 and 195.

During actual welding operations, cam surfaces 55 control the angle of the welding head, as previously described, the welding head being latched by detent elements 192 and 196, as just described. When welding is completed, the heads must be retracted for travel through the pipe to the next joint.

To accomplish this, the equipment is inched past the normal stop position out of control of cam surface 55. A supplemental cam 200 which in effect is an extension of cam 55 is arranged to engage another cam follower 215 secured to a rocker arm 216. See FIGS. 5 and 9. The cam follower 50 does not travel far enough to engage cam 200. Cam follower 215 is moved to the bottom of arcuate guide slot 217, resting in the end 218 of cam 200, FIG. 9. This pulls the arm out of normal latched welding position $D^1$ and depresses it into the retracted position $D^2$. See FIG. 8A. A stiff torsion spring 219 normally holds arm 216 and follower 215 in the raised position of FIG. 4.

By means of a brake or drag applied to reel 40, the wire electrode is fed under uniform tension and is so guided that whatever cast or curvature it has is directed always in the same direction. The relative position of the arc does not shift with respect to the unit so there is a substantially fixed arc point which is carried around the periphery to the place the weld precisely at the juncture between the two pipes. The movable parts are mounted in precision bearings, manufactured to low tolerances to insure strict alignment.

It will be understood that various modifications may be made, as suggested above, and many others, as will readily occur to those skilled in the art. It is intended by the claims which follow to cover all such as broadly as the state of the prior art properly permits.

I claim:

1. A replaceable welding cartridge adapted for use and quick replacement in a circular or segmental carrier which is designed to carry said cartridge around an orbital path to form a weld between juxtaposed annular objects to be secured together, such as large diameter pipe sections and the like, said cartridge comprising, in combination, a light framework comprising side members joined by transverse connections and having opposed ends and adapted to be carried endwise by said carrier, a welding head pivotally secured to linkage secured to said light framework for movement to various angular positions with respect to the orbital welding path, a releasable locking element at one end of said light framework adapted to engage a cooperative locking element in the carrier to hold said one end in working position in said carrier, cooperative multiposition releasable locking means on said carrier and at the other end of said light framework for holding said other end selectively in an operating position, or in a withdrawn nonoperating position, and self-contained electrode feed means comprising wiregripping rollers mounted in said light framework for supplying consumable electrode material to said head during welding.

2. Combination according to claim 1 which includes a pair of rollers suspended in said light framework for feeding a slender consumable electrode material to a welding arc, a means for mounting one of said rollers for movement towards and from the other of said rollers, and a driver motor also suspended in said framework for driving one of said rollers.

3. Combination according to claim 1 which includes means for holding a supply of consumable electrode wire, means for feeding said wire to said welding head, and restraining means for controlling said supply holding means to prevent springing out or backup of said wire and consequent entanglement thereof.

4. Combination according to claim 3 which includes means for moving said supply in bodily translation movement or take up slack in the wire.

5. Combination according to claim 1 which includes reel means for holding a supply of consumable electrode wire, means for feeding said wire from said reel to said welding head, means for supplying welding current to said head, and guide means for said wire extending between the feeding means and the welding head, said guide means being arranged to enclose said wire and positioned to minimize bending of said wire, thereby to maintain substantially constant the degree and direction of said cast as the wire is fed to the welding position, regardless of changes in direction of projection of the welding head.

6. A welding cartridge according to claim 1 in which the welding head is pivotally mounted in parallel linkage, which in turn is pivoted in said light framework, so that said head can be moved both bodily and in angular disposition for presenting electrode material to an instantaneous weld position in space at various angles without changing said instantaneous weld position.

7. A welding cartridge according to claim 1 which comprises a first set of parallel arms pivotally mounted in said light framework, a second pair of parallel arms pivotally attached to said first parallel arms and to said welding head, and means for moving said first parallel arms to move said head in transistory movement, while simultaneously changing its angle with respect to said welding path, without substantially displacing the arc along said path.

8. A replaceable welding cartridge unit adapted to be quickly inserted in and removed from a main welding machine frame, said cartridge comprising, in combination, a welding head pivotally and transitionally mounted in a framework comprising a pair of spaced side frames, means joining said side frames, arm means pivotally mounted between said side frames and carrying a movable carriage for movement parallel to said side frames, means on said movable carriage for supporting a reel of consumable electrode wire, wire feed means also supported on said carriage and comprising a pair of opposed rollers and drive means for one of said rollers for advancing electrode wire from said reel to said welding head along a feed path, and means connecting said arm means to said welding head, so that pivotal movement of said arm means changes the angular position of said head while simultaneously shifting bodily the carriage and the wire supply and feed means carried thereby, whereby the length of wire feed path between the feed rollers and the welding head is not changed substantially and the welding arc spatial position relative to said side frames is substantially unchanged.

9. Combination according to claim 8 which includes movable mounting means supporting the welding head for angular movement without substantial change in the welding arc position with respect to said framework, said movable mounting means comprising two pairs of parallel linkage members pivotally attached to said framework, a swinging carrier member supported for translational movement at spaced points by said respective pairs of parallel linkage members, other parallel linkage members supported by said pairs of linkage members, the welding head being supported jointly by said pairs and other linkage members for change in its angle of projection when shifted by said members, wire electrode feeding means supported by said other members in such a manner as to move in translation when the projection angle of the head is changed so as to keep substantially constant the effective distance between said feeding means and said head, and a wire electrode supply means attached to said swinging carrier for maintaining a substantially constant overall length of wire between the supply means and the welding head in different positions of adjustment of said head.

10. Combination according to claim 9 wherein the framework comprises wire guide means for precisely controlling the movement of the electrode supply means during said angular and translational changes.

11. Combination according to claim 9 wherein relatively stationary cam means are provided for causing and controlling said angular and translational changes as the unit moves about its orbital path.

12. Combination according to claim 8 which includes stationary cam means associated with the main welding machine frame and two cam followers on the unit framework, one of said followers being adapted to change progressively the projection angle of said welding head as it moves in an orbital path, and the other follower being adapted to shift the welding cartridge unit from a welding position to a retracted position.